United States Patent
Kumar et al.

(10) Patent No.: US 7,561,511 B1
(45) Date of Patent: Jul. 14, 2009

(54) CONFIGURABLE OFDM TRANSCEIVER

(75) Inventors: Nishant Kumar, San Diego, CA (US);
Dan Meacham, San Diego, CA (US)

(73) Assignee: Staccato Communications, Inc., San Diego, CA (US)

( * ) Notice: Subject to any disclaimer, the term of this patent is extended or adjusted under 35 U.S.C. 154(b) by 805 days.

(21) Appl. No.: 10/877,938

(22) Filed: Jun. 24, 2004

Related U.S. Application Data

(60) Provisional application No. 60/482,340, filed on Jun. 24, 2003.

(51) Int. Cl.
 *H04J 11/00* (2006.01)
(52) U.S. Cl. .................. 370/208; 370/210; 375/260
(58) Field of Classification Search .......... 370/203, 370/208, 210, 204, 205, 209, 295; 375/130, 375/260; 708/403, 404, 406, 408
See application file for complete search history.

(56) References Cited

U.S. PATENT DOCUMENTS

| | | | | |
|---|---|---|---|---|
| 6,005,876 A | * | 12/1999 | Cimini et al. | 370/525 |
| 6,366,936 B1 | * | 4/2002 | Lee et al. | 708/404 |
| 6,404,783 B1 | * | 6/2002 | Cimini et al. | 370/525 |
| 6,842,421 B1 | * | 1/2005 | Sarraf et al. | 370/208 |
| 6,937,557 B1 | * | 8/2005 | Sudo | 370/203 |
| 7,042,858 B1 | * | 5/2006 | Ma et al. | 370/331 |
| 2002/0172184 A1 | * | 11/2002 | Kim et al. | 370/344 |
| 2004/0008616 A1 | * | 1/2004 | Jung et al. | 370/203 |
| 2004/0120416 A1 | * | 6/2004 | Pauli et al. | 375/267 |
| 2004/0136313 A1 | * | 7/2004 | Goldstein et al. | 370/203 |
| 2004/0160892 A1 | * | 8/2004 | Agrawalla et al. | 370/203 |

OTHER PUBLICATIONS

Shousheng He and Mats Torkelson, Designing Pipeline FFT Processor for OFDM (de) Modulation, Sweden, 1998.
IEEE Transactions on Acoustics, Speech, and Signal Processing, vol. 37, No. 12, Dec. 1989.
Shousheng He and Mats Torkelson, A New Approach to Pipeline FFT Processor, Sweden, 1996.

\* cited by examiner

*Primary Examiner*—Ricky Ngo
*Assistant Examiner*—Gary Mui
(74) *Attorney, Agent, or Firm*—Van Pelt, Yi & James LLP

(57) ABSTRACT

A configurable Orthogonal Frequency Division Multiplexing (OFDM) device comprises a first transform stage configured to generate a first stage output having a first length, a second transform stage configured to operate in conjunction with the first transform stage and to generate a second stage output having a second length, and a switching network configured to selectively connect the second transform stage with the first transform stage to select the first stage output or the second stage output. A method of configuring an Orthogonal Frequency Division Multiplexing (OFDM) device comprises determining an appropriate OFDM mode, based on the OFDM mode determined, selectively connecting a first transform stage of the device with a second transform stage of the device, wherein the first transform stage has a first stage output and the second transform stage has a second stage output, and selecting the first stage output or the second stage output.

21 Claims, 5 Drawing Sheets

CONFIGURABLE OFDM TRANSCEIVER

CROSS REFERENCE TO RELATED APPLICATIONS

This application claims priority to U.S. Provisional Patent Application No. 60/482,340 entitled CONFIGURABLE IFFT/FFT ARCHITECTURE FOR MULTIBAND OFDM APPLICATION filed Jun. 24, 2003 which is incorporated herein by reference for all purposes.

FIELD OF THE INVENTION

The present invention relates generally to communication systems. More specifically, an orthogonal frequency division multiplexing (OFDM) system and method are disclosed.

BACKGROUND OF THE INVENTION

As communications technologies advance, the number of communications protocols and applications are increasing. There is growing demand for multi-purpose devices that can support multiple protocols or applications. Such devices typically include separate circuitries for different purposes, resulting in increased complexity and cost.

For example, multi-band Orthogonal Frequency Division Multiplexing (OFDM) devices typically employ Inverse Fast Fourier Transform (IFFT) circuitry for frequency to time domain conversion in transmitters and Fast Fourier Transform (FFT) circuitry for time to frequency domain conversion in receivers. The current proposal for ultra wideband (UWB) according to Multi-band OFDM Alliance (MBOA) 802.15.3a standard suggests a 128-point IFFT/FFT implementation that includes 128 inputs and 128 outputs. It may be useful for compatibility reasons to make the transmitters and receivers configurable so that other implementations (such as a 64-point IFFT/FFT implementation that includes 64 inputs and 64 outputs) are also supported. A typical approach for implementing a configurable 64-point and 128-point IFFT/IFFT involves using two independent IFFT/FFT circuitries and switching between them. The 64-point IFFT/FFT circuitry can be implemented using either a radix-4 core or a radix-2 core. The 128-point IFFT/FFT circuitry can also be implemented using a radix-4 or a radix-2 core. A radix-4 core is typically more complex computationally and consumes more power than a radix-2 core. It would be desirable if multi-purpose devices such as dual mode 802.11 a/g and UWB transceivers could be implemented without requiring multiple independent circuitries, so that lower device size and cost could be achieved. It would also be useful if such devices could operate more efficiently, and could easily switch between different modes.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Configurable OFDM devices are disclosed. In some embodiments, a configurable OFDM device includes a first transform stage, and a second transform stage configured to operate in conjunction with the first transform stage. A switching network selectively connects the second transform stage to the first transform stage to select the first stage output or the second stage output. The selection may be controlled in part by the operational requirements, operational mode, etc. The first and second stage may be IFFT stages or FFT stages that include mixed radix elements. The elements in the stages may have inputs/outputs that are of different length.

Figure 1:
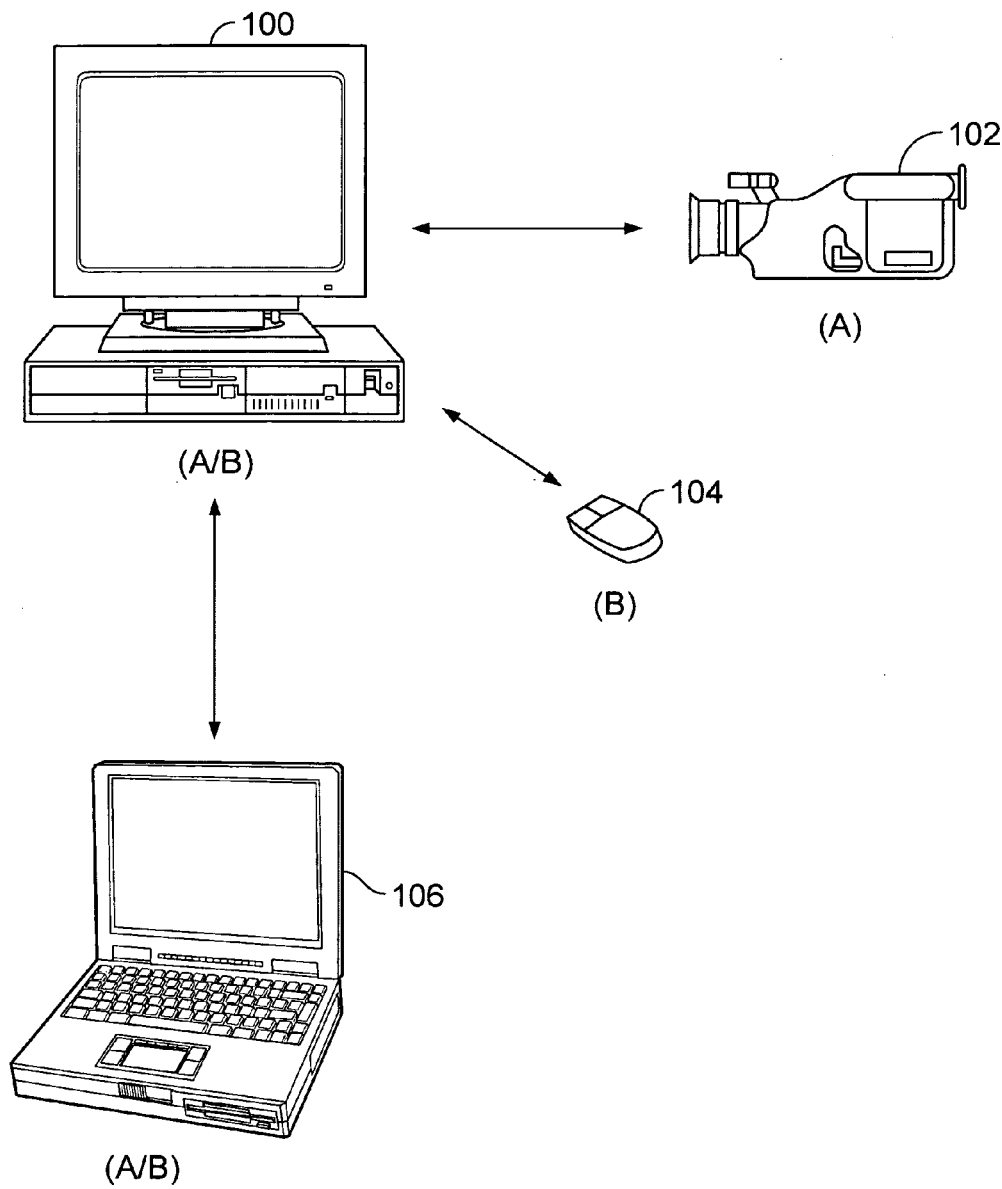
FIG. 1 is a system diagram illustrating a wireless communications environment that includes several devices.

FIG. 1 is a system diagram illustrating a wireless communications environment that includes several devices. The devices shown in this example communicate via ultra wideband connections using OFDM modulation. Each device supports operational mode A or B or both. 128-point IFFT/FFT is used when operating in mode A to process 128 input data points serially or in parallel and 64-point IFFT/FFT is used when operating in mode B to process 64 input data points serially or in parallel. Throughout this specification, devices configurable to perform 64-point IFFT/FFT or 128-point IFFT/FFT are described for purposes of example. Other IFFT/FFT lengths and configurations are also possible in some embodiments. The power consumption of operating in mode A tends to be higher than operating in mode B. In general, mode A is suitable for devices that require a high rate of data transfer, such as camcorder 102. Mode B is suitable for devices that do not require as high a data rate as well as for devices using different protocols (e.g. 802.11a/g), such as mouse 104. Desktop computer 100 is able to communicate with both camcorder 102 and mouse 104, and supports both modes of operation. Similarly, laptop computer 106 also supports both modes. In some embodiments, mode A devices correspond to a particular standard implementation (e.g. 802.15.3a), mode B devices correspond to a different standard implementation (e.g. 802.11a/g) and mode A/B devices correspond to devices compliant with either standards. The transmitters and receivers of computers 100 and 102 incorporate mixed radix IFFT/FFT cores that allow switching between different modes. Details of mixed radix implementation are discussed below.

Figure 2A:
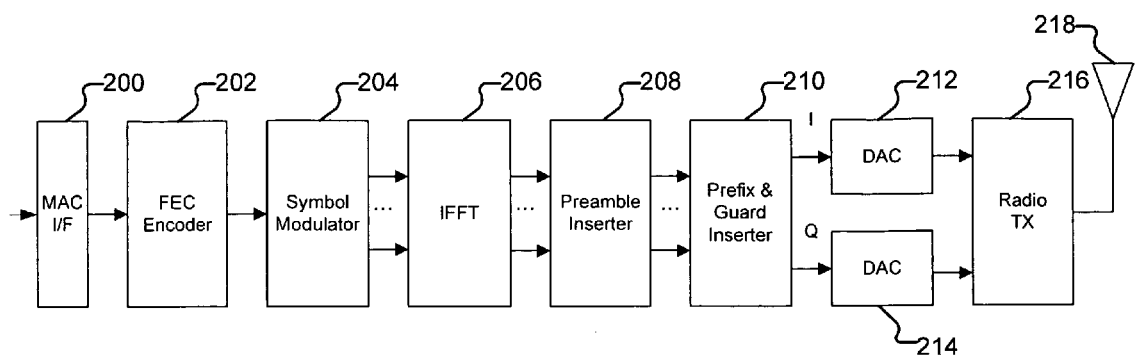
FIG. 2A is a block diagram illustrating a UWB transmitter embodiment.

FIG. 2A is a block diagram illustrating a UWB transmitter embodiment. In this example, the modulation scheme employed is orthogonal frequency division multiplexing (OFDM). Data bits are received on media access control (MAC) interface 200 and then encoded by a forward error correction (FEC) encoder 202. In some embodiments, the encoded bits are optionally punctured, interleaved and repeated to provide better protection against multipath and interference. The bits are then mapped to modulation symbols by a symbol modulator 204. An inverse Fast Fourier Transform (IFFT) component 206 is used to transform blocks of symbols from frequency domain into a time domain waveform (also referred to as an OFDM symbol). A preamble is then added to the OFDM symbol by preamble inserter 208 and a guard interval and a cyclic/zero prefix are added to the OFDM symbol by prefix and guard inserter 210. In some embodiments, interpolation and amplitude clipping are optionally applied to the OFDM symbol. The inphase (I) and quadrature (Q) components of the baseband OFDM signal are converted from digital to analog by digital to analog converters (DACs) 212 and 214, respectively. The analog signals are sent to a radio transmitter 216 and transmitted via antenna 218.

Figure 2B:
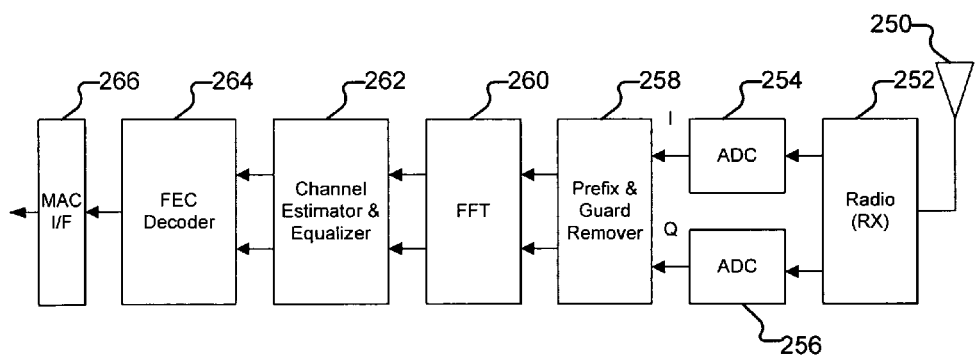
FIG. 2B is a block diagram illustrating a UWB receiver embodiment.

FIG. 2B is a block diagram illustrating a UWB receiver embodiment. In this example, OFDM signal is received on antenna 250 by radio receiver 252, which divides the signal into I and Q components and converts the signal to baseband. Analog to digital converters (ADCs) 254 and 256 convert the baseband signal to digital. In some embodiments, the digital baseband signal is optionally processed by a decimation stage. The prefix and guard intervals remover 258 removes the prefix and guard intervals. An FFT component 260 converts the time domain OFDM waveforms to frequency domain samples. Channel estimator and equalizer 262 processes the frequency domain samples to mitigate the effects of multipath propagation. The output is then optionally despread, deinterleaved and depunctured. FEC decoder 264 then decodes the signal and sends the decoded signal to MAC interface 266 to be further processed.

Figure 3:
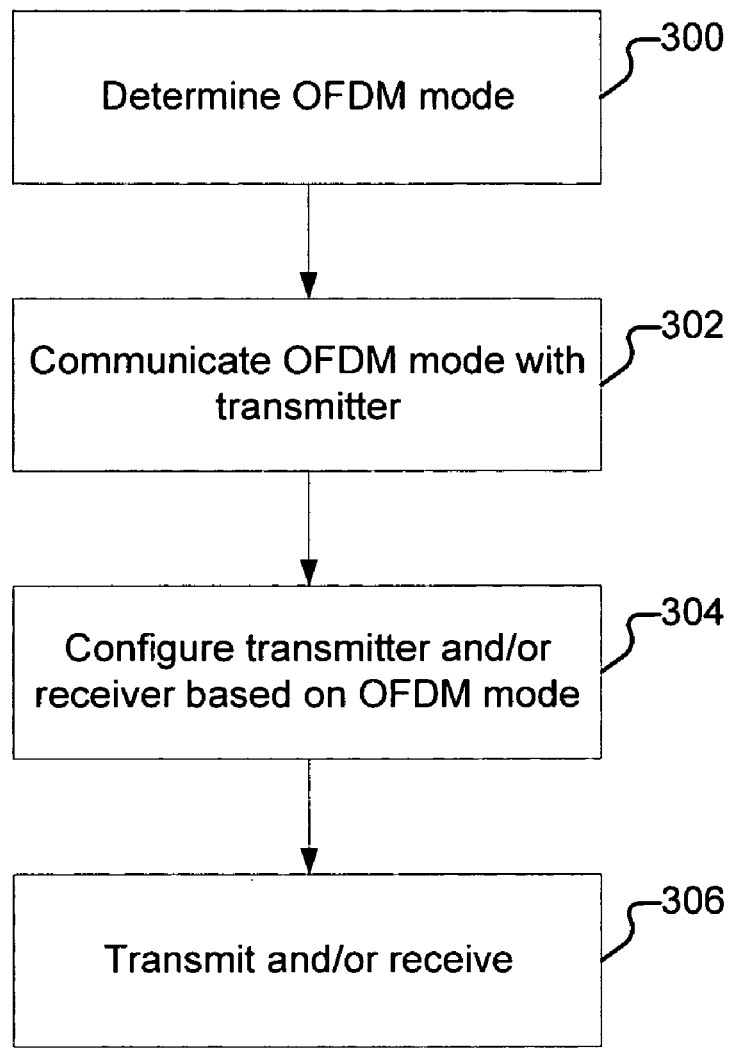
FIG. 3 is a flowchart illustrating an example initialization process of a device that supports multiple OFDM modes.

FIG. 3 is a flowchart illustrating an example initialization process of a device that supports multiple OFDM modes. The process shown in this example is applicable to multi-mode devices such as computer 100 of FIG. 1. At the beginning of the process, the appropriate OFDM mode is determined (300). The determination can be made in several ways. For example, a device on the wireless network, such as camcorder 102 or mouse 104 of FIG. 1 may send its OFDM mode information to the multi-mode device. The mode information may be included in the header or payload of the packet, which can be received by the MAC interface of the multi-mode device receiver and interpreted. Sometimes it may be useful for a device on the network to switch mode in order to conserve power or increase data rate. While operating in its current mode, a device such as laptop computer 106 of FIG. 1 may communicate information about the upcoming mode change via the header or payload of a packet. A device equipped with a multi-mode transceiver such as computer 100 can receive the packet and determine the appropriate OFDM mode. It is also possible for a device to choose an OFDM mode on its own, based on selection criteria such as power consumption restriction, link margin, etc.

Once the OFDM mode is determined, the information is communicated to the transmitter of the device, and optionally to other devices on the network (302). The transmitter and/or receiver are then configured based on the appropriate OFDM mode (304). For example, if mode A is being used, then the IFFT and FFT components of the transmitter and the receiver, respectively, are configured to be 128-point; if mode B is used, the IFFT and FFT components are configured to be 64-point. The device is then ready to transmit and/or receive data in the selected mode (306).

Figure 4:
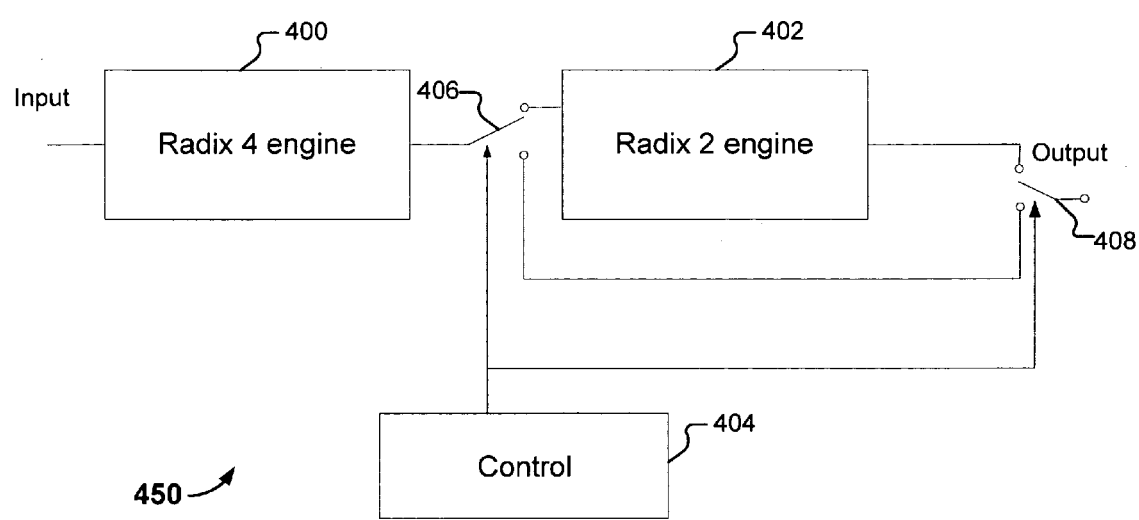
FIG. 4 is a block diagram illustrating a mixed radix IFFT/FFT architecture according to some embodiments.

FIG. 4 is a block diagram illustrating a mixed radix IFFT/FFT architecture according to some embodiments. In this example, processing logic 450 includes a radix-4 engine 400 and a radix-2 engine 402. The radix-2 engine in this example is implemented using radix-2 IFFT/FFT elements. The radix-4 engine may be implemented using radix-4 IFFT/FFT elements, or elements of different radix length (also referred to as mixed radix) such as combinations of radix-2 and radix-4 elements, radix-2 and radix-8 elements, etc. Depending on whether the elements are configured to perform IFFT or FFT, processing logic 450 functions as an IFFT processor that is preferably used in OFDM transmitters or an FFT processor preferably used in OFDM receivers. Switches 406 and 408 are controlled by control logic 404, which selectively connects the output of radix-4 engine 400 to the input of radix-2 engine 402 or to the output of processor 450. If 128-point IFFT or FFT processing is required, radix-4 engine 400 and radix-2 engine 402 are connected. In this example, radix-4 engine 400 is capable of processing 128 points of input data as well as input data length lower than 128 points. If 64-point IFFT or FFT processing is required, the output of radix-4 engine 400 is directly sent to the output of the overall logic. In some embodiments, the controls of radix-4 engine 400 are configurable for switching between 128-point and 64-point operations.

Figure 5:
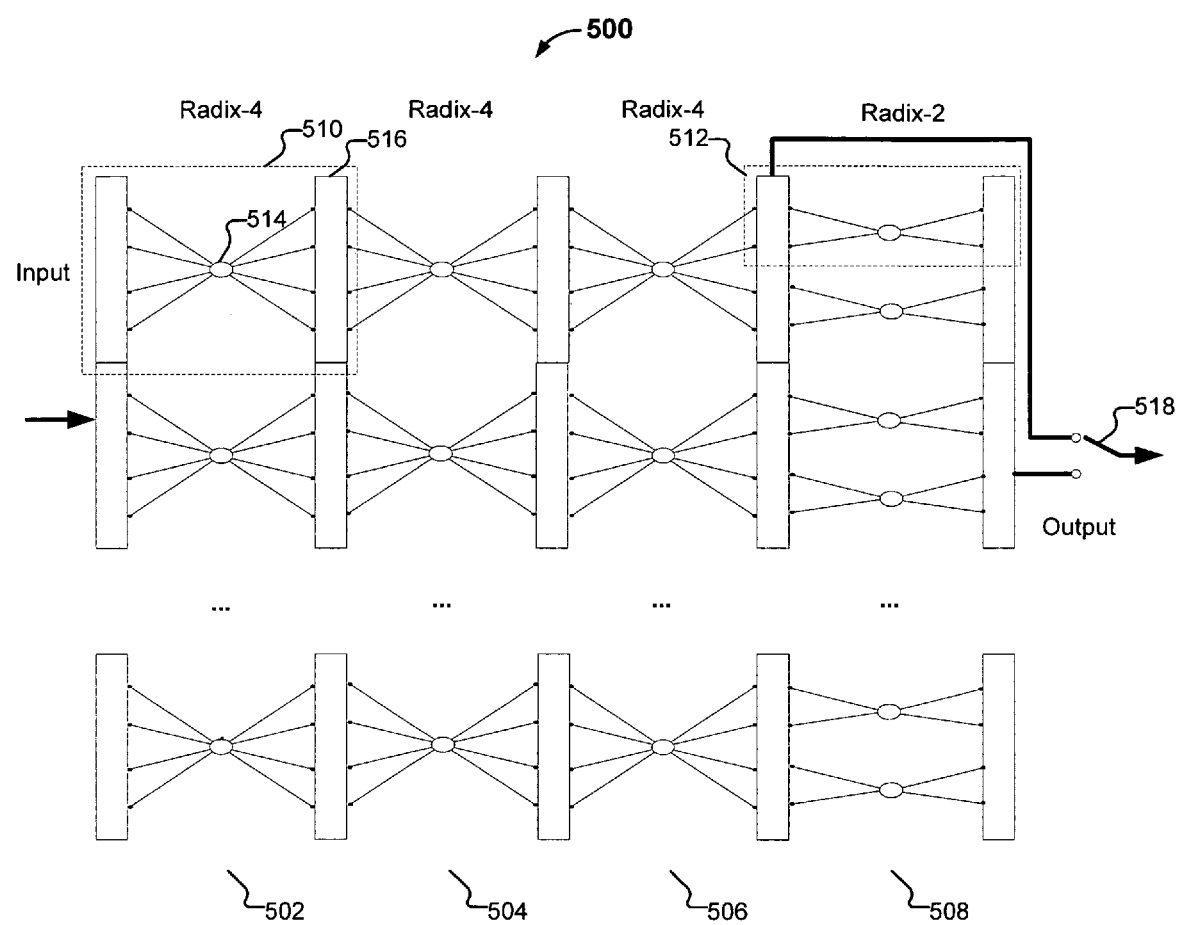
FIG. 5 is a diagram illustrating the implementation of a mixed radix IFFT/FFT processor according to some embodiments.

FIG. 5 is a diagram illustrating the implementation of a mixed radix IFFT/FFT processor according to some embodiments. In this example, processor 500 includes three radix-4 stages (502, 504 and 506) and a radix-2 stage 508. Each stage includes a plurality of IFFT/FFT elements such as 510 and 512. A radix-4 IFFT/FFT element (such as 510) has four input data points, which are transformed to yield four output data points. In some embodiments, processing components such as 514 and 516, which may include delay lines, commutators as well as other appropriate logical elements, perform various functions such as buffering, algebraic computation, data delay, data remapping, etc. to implement the desired transform. Four output data points are sent to the next stage. The data points may be reordered before they are processed by the next stage. Depending on the implementation of the processor, reordering may take place among the four outputs of the same element, or among outputs of different elements of the same stage. Given 64 input data points, 64-point IFFT/FFT outputs can be obtained from the outputs of radix-4 stage 506.

Optionally, the outputs of radix-4 506 are sent to radix-2 stage 508. A radix-2 element such as 512 also performs appropriate functions to implement IFFT or FFT and processes two input data points to yield two output data points. Given 128 input data points, radix-2 stage 508 and radix-4 stages 502-506 are combined to provide 128 points of IFFT/FFT outputs. Layout of the stages may vary in different implementations. For example, the radix-2 stage precedes the radix-4 stages in some embodiments. The ordering of inputs and outputs between stages may vary as well. IFFT/FFT stages with elements having other radix lengths (radix-8, radix-3, etc.) may also be used. In some embodiments, the radix-4 stages are implemented using other types of elements, such as radix-2 elements, mixed radix elements including radix-2 and radix-4 radix, radix-2 and radix-8 elements, or any other appropriate combination.

In this example, a switch 518 selectively connects the outputs of radix-4 stage 506 or the outputs of radix-2 stage 508 to the outputs of the processor. In some embodiments, based on the desired mode of operation for the device, a control signal is generated to select the outputs. In some embodiments, the control signal also determines which inputs are enabled.

A configurable OFDM device has been disclosed. Devices with configurable radix-2 and radix-4 stages that can be configured to perform 64-point or 128 point IFFT/FFT are discussed in detail for purposes of example. The techniques are also applicable to other input/output lengths and the device may be comprised of IFFT/FFT elements having other radix lengths.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A configurable Orthogonal Frequency Division Multiplexing (OFDM) device comprising:
   a first transform stage configured to receive a first stage digital input that includes a first plurality of input bits and to generate a first stage digital output that includes a first plurality of output bits having a first length;
   a second transform stage configured to operate in conjunction with the first transform stage, to receive a second stage digital input that includes a second plurality of input bits, and to generate a second stage digital output that includes a second plurality of output bits having a second length; and
   a switching network that is controlled by a control signal indicating a desired OFDM mode and that is configured to selectively disconnect the second transform stage from the first transform stage or connect the second transform stage with the first transform stage according to the desired OFDM mode; wherein:
   the first length corresponds to a first output length of a first OFDM operational mode, the second length corresponds to a second output length of a second OFDM operational mode, and the first length is different from the second length;
   in the event that the switching network selectively disconnects the second transform stage from the first transform stage, the first stage digital output is provided as a device output, wherein the first stage digital output includes the first plurality of output bits having the first length that corresponds to the first output length of a first OFDM operational mode; and
   in the event that the switching network selectively connects the second transform stage with the first transform stage, the second stage digital output is provided as the device output, wherein the second stage digital output includes the second plurality of output bits having the second length that corresponds to the second output length of the second OFDM operational mode.

2. A configurable OFDM device as recited in claim 1, wherein the first transform stage is a first Inverse Fast Fourier Transform (IFFT) stage and the second transform stage is a second IFFT stage.

3. A configurable OFDM device as recited in claim 1, wherein the first transform stage is a first Fast Fourier Transform (FFT) stage and the second transform stage is a second FFT stage.

4. A configurable OFDM device as recited in claim 1, wherein the input of the second transform stage is selectively connected to the output of the first transform stage.

5. A configurable OFDM device as recited in claim 1, wherein the first transform stage includes one or more radix-4 stages and the second transform stage includes a radix-2 stage.

6. A configurable OFDM device as recited in claim 5, wherein the radix-4 stage includes a radix-4 element.

7. A configurable OFDM device as recited in claim 5, wherein the radix-4 stage includes two elements of different radix length.

8. A configurable OFDM device as recited in claim 1, wherein the first transform stage includes mixed radix stages and the second transform stage includes a radix-2 stage.

9. A configurable OFDM device as recited in claim 8, wherein the radix-4 stage includes a radix-4 element.

10. A configurable OFDM device as recited in claim 8, wherein the radix-4 stage includes two elements of different radix length.

11. A configurable OFDM device as recited in claim 1, wherein the first transform stage includes a radix-2 stage and the second transform stage includes one or more radix-4 stages.

12. A configurable OFDM device as recited in claim 1, wherein the first transform stage includes a radix-2 stage and the second transform stage includes mixed radix stages.

13. A configurable OFDM device as recited in claim 1, wherein the configurable OFDM device is configured to modulate OFDM symbols.

14. A configurable OFDM device as recited in claim 1, wherein the configurable OFDM device is configured to modulate OFDM symbols according to Multi-band OFDM Alliance (MBOA) 802.15.3a standard.

15. A configurable OFDM device as recited in claim 1, wherein the configurable OFDM device is configured to modulate OFDM symbols in a first mode when the switching network connects the second transform stage with the first transform stage, and selecting the first stage output and to modulate OFDM symbols in a second mode by selecting the second stage output.

16. A configurable OFDM device as recited in claim 1, wherein the configurable OFDM device is configured to demodulate OFDM symbols.

17. A configurable OFDM device as recited in claim 1, wherein the configurable OFDM device is configured to demodulate OFDM symbols according to Multi-band OFDM Alliance (MBOA) 802.15.3a standard.

18. A configurable OFDM device as recited in claim 1, wherein the configurable OFDM device is configured to demodulate OFDM symbols in a first mode when the switching network connects the second transform stage with the first transform stage, and selecting the first stage output and to demodulate OFDM symbols in a second mode by selecting the second stage output.

19. A method of configuring an Orthogonal Frequency Division Multiplexing (OFDM) device, comprising:
   determining an appropriate OFDM mode;
   based on the OFDM mode determined, selectively connecting a first transform stage of the device with a second transform stage of the device or disconnecting the first transform stage of the device with the second transform stage of the device; wherein the first transform stage is configured to receive a first stage digital input that includes a first plurality of input bits and to generate a first stage digital output that includes a first plurality of output bits having a first length and the second transform stage is configured to operate in conjunction with the first transform stage, to receive a second stage digital input that includes a second plurality of input bits, and to generate a second stage digital output that includes a second plurality of output bits having a second length, and wherein the first length corresponds to a first output length of a first OFDM operational mode, the second length corresponds to a second output length of a second OFDM operational mode, and the first length is different from the second length;

in the event that the second transform stage is disconnected from the first transform stage, providing the first stage digital output as a device output, wherein the first stage digital output includes the first plurality of output bits having the first length that corresponds to the first output length of a first OFDM operational mode; and in the event that the second transform stage is connected with the first transform stage, providing the second stage digital output as the device output, wherein the second stage digital output includes the second plurality of output bits having the second length that corresponds to the second output length of the second OFDM operational mode.

20. A method of configuring an OFDM device as recited in claim 19, wherein determining the appropriate OFDM mode includes receiving mode information from another device.

21. A method of configuring an OFDM device as recited in claim 19, wherein determining the appropriate OFDM mode includes choosing an OFDM mode based on a selection criteria.

\* \* \* \* \*